Nov. 20, 1962 — F. A. KROHM — 3,064,297
WIPER ARM ASSEMBLY
Filed Nov. 19, 1958 — 2 Sheets-Sheet 1

Fig. 1
Fig. 2
Fig. 3
Fig. 4

INVENTOR.
FRED A. KROHM
BY
ATTORNEYS

United States Patent Office 3,064,297
Patented Nov. 20, 1962

3,064,297
WIPER ARM ASSEMBLY
Fred A. Krohm, Hobart, Ind., assignor to The Anderson Company, a corporation of Indiana
Filed Nov. 19, 1958, Ser. No. 774,955
28 Claims. (Cl. 15—250.20)

This invention relates generally to windshield wiper arms and more particularly is directed to improved means on the arm for varying the pressure available at its end for pressing a wiper blade against a windshield.

Each year the trend in the automobile industry has been to introduce new automobile models containing windshields (as well as other glass surfaces) having a greater degree of curvature both in the horizontal and vertical planes. The greater curvatures have produced many new problems for the conventional wiper equipment as well as magnifying many older ones, which problems are encountered in keeping the windshield clear under varying conditions of weather. The greatest problems involved relate, first, to the tendency of the wiper blade to be lifted from the windshield by wind pressure at higher speeds, and second to keeping the blade pressed sufficiently tightly against the windshield at all points around the sharper side curves thereof to produce efficient wiping. The just-enumerated problems could be substantially solved for any one design by increasing the pressure of the wiper arm on the blade. Unfortunately, no two automobile manufacturers provide windshields of the same curvature in any one year, and, in fact, very seldom does the same manufacturer produce automobiles using the same curvature for two succeeding years so that each windshield of a different curvature requires a different pressure to solve the above problems most efficiently.

Accordingly, it is a principal object of this invention to overcome the above-noted disadvantages and to provide improved means for adjustably varying the amount of pressure exerted by a biasing means or spring operatively associated with a windshield wiper arm for urging the latter and a blade carried thereby in a direction to cause the blade to correctly bear against a windshield.

A further object of the invention is to provide a tensioning means of simple construction and operation which may not only be economicaly manufactured, but which is efficient in use, uniform in operation and comprised of a few durable operating parts.

Another object of the invention is to provide the arm with a stop or abutment means for stabilizing the operation of the adjustable means utilized to vary the force exerted by the biasing means for urging the outer arm unit toward a windshield, including improved means for supporting a part of the adjustable means.

Additional objects of the invention reside in providing a unique way of attaching a cover to the arm, means for facilitating longitudinal adjustment of an outer blade-carrying section of the arm, means for connecting the biasing means to the inner section of the arm, and means carried by the outer arm section in a unique manner for connection with a wiper blade.

A specific object of the invention is to provide a component of a windshield wiper apparatus with an indicator, which is associated with the component in a unique way.

The above and other objects and advantages of the invention will become apparent as the description of the same proceeds, and the invention will be best understood from a consideration of the following detailed description taken in connection with the accompanying drawing forming part of this specification, with the understanding, however, that the invention is not confined to any strict conformity with the showing of the drawing, but may be changed or modified so long as such changes or modifications mark no material departure from the salient features of the invention as expressed in the appended claims.

This application is a continuation-in-part of my co-pending application Serial No. 625,977, filed December 3, 1956, now abandoned, and includes improvements thereover with respect to mounting the bracket, lever and biasing components which will be subsequently referred to, and is also related to my earlier copending applications Serial No. 329,366, filed January 2, 1953, now Patent No. 2,860,364, and Serial No. 517,837, filed June 24, 1955, now Patent No. 2,860,365, Referring to the drawings, the wiper arm, among other things, includes an inner or first section 10 for attachment with a drive shaft 11, an intermediate tapered channel or second section 12 pivotally connected to the first section 10 by a cross pin 13, and an elongate outer bar or third section 14 having an inner end secured to the intermediate or second section 12 by a locking means 15 such as shown in U.S. Patent No. 2,350,134 of T. J. Smulski, issued May 30, 1944. A connector 16 is provided adjacent the outer end of the bar or third section 14 to which a wiper blade may be removably attached.

Figure 1:
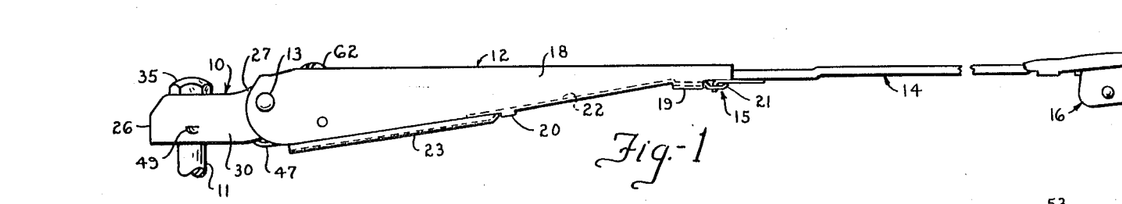
FIGURE 1 is a side elevation of the windshield wiper arm embodying the invention.

The intermediate or second section 12 includes a body of U-shaped construction having a top wall 17 and side walls 18, the latter of which are each provided with the pairs of inturned fingers 19 and 20 along their lower edge portions thereof, see FIGURE 1. Fingers 19, which are disposed near the narrow outer end of the second section 12, are inturned and clamped against the end 21 of the cover member 22, forming a springy lever engaging part of locking means 15 for retaining the bar or third section 14 in an adjustable position longitudinally but in locked relation with said second section 12. The fingers 20 medially positioned along the lower edge of the walls 18 of the second section 12 are likewise inturned and clamped against a cover member 23 which overlaps the inner end portion of cover member 22. Said cover members 22, 23, are adapted primarily to enclose the working parts positioned within the second section by closing off the under portion thereof.

The inner or first section 10 of the arm is preferably made in the form of a shell or housing comprising a generally cylindrical portion 26 and an integral radially extending portion 27. The cylindrical portion has a top wall 28 and the radial portion 27 includes a top wall 29 and a pair of side walls 30. The side walls 30 are spaced apart a distance to be interposed within and be overlapped approximately in rubbing contact by a portion of the side walls 18 of the second section 12. The pivot or cross pin 13 extends through the side walls 18 for pivotally supporting said first and second sections together. Extending the walls 30 outwardly beyond the pin 13 forms a bearing surface to stabilize the pivotal movement between the inner and intermediate sections of the arm.

Figures 2, 3, 4:
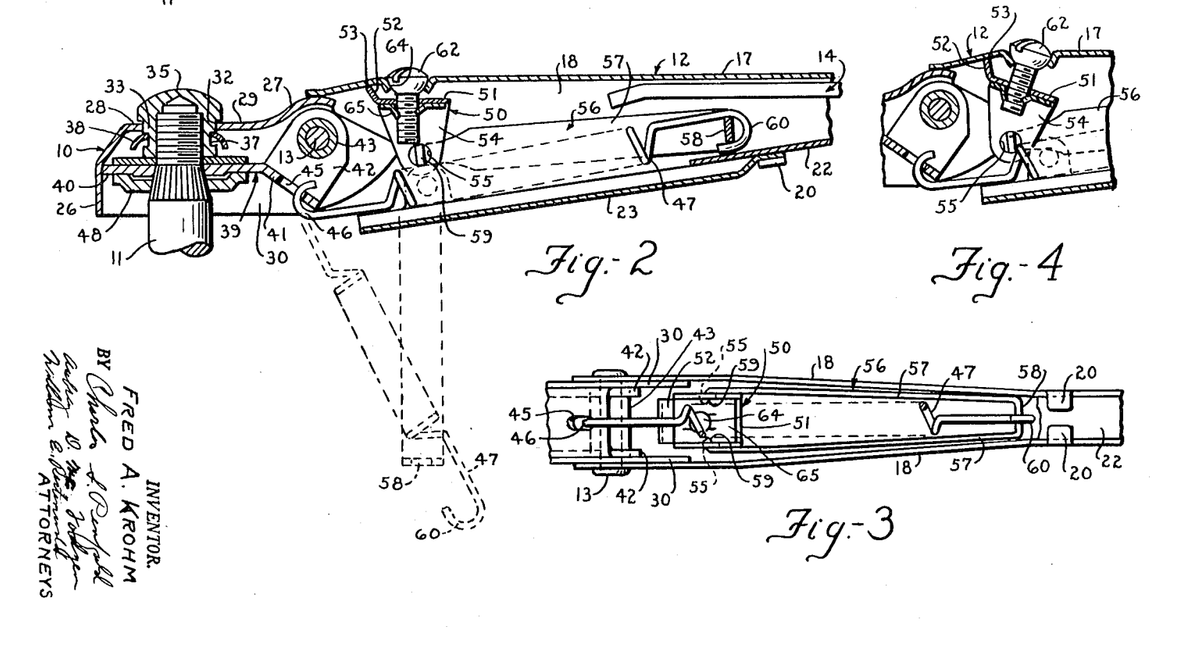
FIGURE 2 is an enlarged sectional side elevation of a portion of the arm illustrated in FIGURE 1.
FIGURE 3 is a bottom view of a portion of the wiper arm shown in FIGURES 1 and 2 with the bottom cover removed.
FIGURE 4 is an enlarged side view of a portion of the adjustable spring-tensioning means of the arm of FIGURE 2 showing different adjusted positions that the spring-holding means thereof may occupy.

The top wall 28 of the cylindrical portion 26 of the first section 10 is provided with a generally centrally disposed round hole 32 through which a cylindrical shank 33 of a fastening means preferably in the form of a cap nut 35 extends. The shank is internally threaded to receive the reduced threaded end of the drive shaft 11 as shown in FIGURE 2. The nut is preferably locked to the inner section by providing the shank 33 with a reduced neck portion 37 which seats a locking element 38 that may bear against the inner side of top wall 28 to trap the nut on the first section 10.

A clutch mechanism housed in the inner section 10 of the arm includes a relatively stationary clutch member 39 having a round flat portion 40 disposed in the cylindrical portion 26 and an integral outwardly extending portion 41 arranged in the radial portion 27 of the inner section. The opposite sides of the extending portion 41 are provided with parallel walls 42 which bear against the inner surfaces of side walls 30 of the radial portion 27. Projecting through the aligned apertures in the walls 42 is the pin 13 which has a sleeve 43 concentrically disposed around its mid-portion for supporting the various walls through which it passes in spaced relation. The extending portion 41 is also provided with an aperture 45 for receiving one hooked end portion 46 of a spring 47, that is provided for a purpose that will appear more fully below.

The clutch member 40 is press fitted into the inner section 10 and since it is also secured thereto by the pin 13 it is firmly anchored in place relative to the member 10. A second clutch member 48 preferably in the form of a substantially flat disc is provided with serrations (not shown) on its upper face which coact with serrations (not shown) on the lower face of the first clutch member 40 so that in the clamped condition the clutch members will not rotate relative to each other. The second clutch member 48 has a tapered aperture through the central portion thereof. The walls of said aperture have a series of serrations disposed substantially axially thereof which are adapted to grip a corresponding shoulder of the drive shaft for locking the arm thereto. The second clutch member 48 is held within the cylindrical portion 26 of the inner section 10 by means of a series of indentations 49 (see FIGURE 1) formed in the walls of said cylindrical section 26 which have a spaced engagement with the lower portion of said clutch member 48.

Threading the nut 35 on the shaft 11 and driving it home will seat the clutch member 48 fixedly against the shaft 11 with clutch member 39 in firm contact therewith for locking the arm in fixed position relative to the shaft. It is obvious that the clutch means may be released by backing the nut off the shaft and another adjusted position selected for the arm, whereupon the clutch may be tightened up again to fix the inner section 10 of the arm relative to shaft 11.

The clutch means above described does not necessarily form an important part of the instant invention and is substantially shown and described in my U.S. Patent No. 2,684,258, issued July 20, 1954.

The intermediate section 12 is pivotally mounted on the inner member 10 that is fixed relative to shaft 11, and a suitable spring-biasing means is connected between the members 10 and 12 to urge the intermediate section 12 and the outer portion 14 of the arm in a direction to cause the blade to bear against the windshield of the car. For this purpose the biasing means or spring 47 is provided with the hook 46 which is secured in the aperture 45 of the member 39 and is stretched across the space provided under walls 17 and 29 and below the pivot pin 13. The outer end of spring 47 is supported on a bracket or lever 56.

A structure is provided for adjusting the lever 56 to vary the tension of the spring 47 in order to control the arm pressure that is exerted against the wiper blade for pressing it against the windshield. The adjusting means preferably comprises a short inverted U-shaped support member 50 having a bridge portion 51 provided with an upturned offset inner end 52 having an edge 53 which is supported on the top wall 17 of the second section 12. The support member 50 has a pair of downwardly depending sides or legs 54, forming the inverted U, which have aligned apertures 55 through the lower portions thereof. The bracket 56 is disposed within the side walls 18 of said second section 12 and includes a pair of elongate side arms 57 joined together at their outer ends by a bridge 58. The bracket 56 is adapted to be pivotally supported on said support member 50 by means of a pair of inturned lugs or ears 59 carried by the free ends of the arms 57 which ears 59 are adapted to pivotally engage in the apertures 55 in said support member to permit the bracket to pivot relative to the member 50. The bridge 58 of the bracket, as will appear more fully below, is adapted to be engaged by the outer hooked end 60 of the spring 47 when said bracket 56 is in the assembled position shown in solid lines in FIGURE 2.

In order to support the spring in an adjustable manner, an adjusting means is provided which comprises adjusting screw 62 seated in a countersunk bore 64 in the top wall 17 of the second section 12. Said screw 62 passes through an aperture in the central portion 51 of the support member 50 and is threadably engaged with a nut 65 which bears against the underside of said support member 50. The adjusting screw 62 serves the twofold purpose of supporting the spring-tensioning structure as well as accomplishing the adjustment of the tension on said spring.

To assemble the tensioning structure on the arm, one end portion 46 of the spring 47 is loosely engaged in the aperture 45 of the clutch member 39 from which it might hang freely as shown in dotted lines in FIGURE 2. The bracket 56 is inserted in support member 50 to be pivoted about ears 59 and may hang down as shown in dotted lines in FIGURE 2. The bracket 56 is then raised toward the full line position of FIGURE 2, whereupon bridge 58 engages with end 60 of the spring and the spring is placed under tension as the bracket completes its movement to the solid-line position of FIGURE 2. The cover member 22 may then be positioned over the open underside of the second section 12 and the pairs of fingers 19 and 20 inturned to lock the cover in place. The cover member 23 may then be assembled with the intermediate arm section 12 by inserting its outer end between the fingers 20 and the inner end of the cover 22. The inner end of the cover 23 is provided with a pair of flexible offsets which extend into the arm section 12 and are provided with openings which detachably receive inturned dimples on the side walls 18 of the section. The covers thus close off the open bottom side of the section 12 and conceal the spring-tensioning structure.

For changing the tension of the spring so as to increase or decrease the amount of pressure the arm exerts to press the wiper blade against the windshield, the screw 62 is turned either clockwise or counterclockwise. Upon turning the screw in one direction, the support member 50 is pivoted about the contact or hinge edge 53 so as to move the legs 54 of support member 50 through an arc substantially along the longitudinal centerline of intermediate member 12. As the member 50 pivots, the apertures in legs 54 carry lugs 59 and legs 57 of bracket 56 lengthwise of the arm which in turn moves the bridge 58 which carries hook end 60 of spring 47 closer to or farther from the relatively fixed hook end 46 thereof for varying the tension of the spring. As shown in FIGURE 2, the support member 50 is in the up position whereby the bracket is in the extreme right-hand position and consequently the spring is tensioned to its maximum degree. After the screw 62 has been turned to the point where support member 50 engages near the end of the screw, the bracket will have been moved to a position such that the hook end 60 of the spring 47 will be much closer to the fixed hook end 46 and the tension on said spring will be relieved somewhat. It is obvious, of course, that as the tension is varied in the spring 47 that the sections 12 and 14 that are pivotally mounted on the relatively fixed section 10, will be urged in a direction such that a wiper blade mounted at the end of section 14 will press against the windshield to a greater or lesser degree. It will be noted that when the least pressure is produced in the system, the screw 62 will be canted in the aperture 64 as shown in FIGURE 4. When the screw is adjusted to produce a greater pressure, the screw 62 tends to approach the perpendicular position with respect to wall 17 as shown in FIGURE 2.

From the foregoing, it will be apparent that I am able to attain the objects of my invention and provide improved means for widely varying the pressure available at the end of a wiper arm for pressing a wiper blade against a windshield. This pressure-varying means is especially important with present day automotive design where it is necessary to have wiper arms of different lengths for different makes of automobiles. The wiper arm above shown and described has a patented means shown at 15 and described above, for varying the length of the arm several inches. It is obvious that as the arm is lengthened, the pressure available at the end of the arm for pressing the blade against a windshield is reduced. The result is that the contact between the blade and windshield becomes insufficient to maintain adequate clearing of the windshield. With the pressure-varying means of the instant invention, it is possible for any mechanic to adjust the tension on the spring by appropriate turning of the screw 62 whereby the pressure of the arm on the blade and against the windshield is increased sufficiently to provide adequate contact for clearing the windshield.

By the same token different makes of automobiles require different lengths of wiper blades to clear the desired area of a windshield. The larger and heavier the wiper blade the greater will be the centrifugal force generated, which when it is resolved in a force diagram with the arm pressure tending to hold the blade on the windshield produces a resultant which in effect tends to lift the blade away from the windshield. To counteract this effect of the greater centrifugal force created by the larger blade it is necessary to increase the amount of pressure available at the end of the arm for pressing the blade against the windshield. This greater force can be created when using the instant invention by proper adjustment of the screw 62.

My improved pressure-varying means also serves to prevent the wiper blade from becoming separated from the windshield by the rush of air over the windshield at high speeds and this is one of the most important uses of the instant invention. At higher speeds or on windy days the rush of air over the windshield of a vehicle lifts certain wiper blades from the windshield so that the desired wiping of the windshield is not accomplished. Increasing the pressure available at the end of the arm for maintaining the wiper blade in contact with the windshield, substantially eliminates the lifting of the blade from the windshield by the wind at higher speeds of travel of the vehicle. This increased pressure of the blade on the windshield is created by appropriate adjustment of the screw 62.

The adjusting screw 62 is located in such an obvious place and in such a manner that any mechanic will be able to immediately notice it and by the application of a slight turning force in the appropriate direction vary the pressure of the arm on the blade and against the windshield as desired.

The arm structure exemplified in FIGURES 5 through 11 of the drawing is provided with certain improvements over the structure described above and disclosed in FIGURES 1 through 4. These improvements include providing the arm with a stop or abutment means for means utilized to adjust the biasing assembly, means for attaching the biasing assembly to the inner arm section, means for facilitating longitudinal adjustment and locking of the outer arm section, means for attaching a cover to the arm, unique connection means carried by the outer section for supporting a wiper blade, and an indicator preferably associated with the connection means.

More particularly in these respects, the arm structure illustrated in FIGURES 5 through 11, among other things, includes an inner section 66, an intermediate tapered channel section 67 pivotally connected to the inner section by a pivot 68, an outer extensible section 69 carried by the channel section and provided with connection means generally designated 70 for supporting a wiper blade not shown, an elongate resiliently flexible cover 71 attached to the arm in a novel way, biasing means generally designated 72 for urging the channel and outer arm section as a unit toward a windshield, means generally designated 73 for adjusting the biasing means, and abutment means 74 for the adjusting means.

The biasing means generally designated 72 includes an elongate lever 75 and a helical tension spring 76. The lever is preferably constructed to provide a pair of legs 77 joined together by a bridge 78. The bridge is provided with a hole 79 for receiving an outer hooked end 80 of the spring and the inner ends of the legs are preferably provided with apertures 81 which pivotally or rockably receive lateral or offset projections or pintles 82 provided on a supporting member 83 which is carried by a manual operable means, such as a screw 84, which extends through a slot 85 provided therefor in a base wall 86 of the channel. More specifically in this regard, the supporting member 83 includes a pair of depending portions 87 from which the projections 82 extend and a bridge portion 88, the latter having a continuation 89 provided with a threaded aperture which receives the shank of the screw. A washer 90 is carried by the screw and located between its slotted head and the base wall of the channel.

Figures 5, 6, 7, 8, 9, 10, 11, 12:
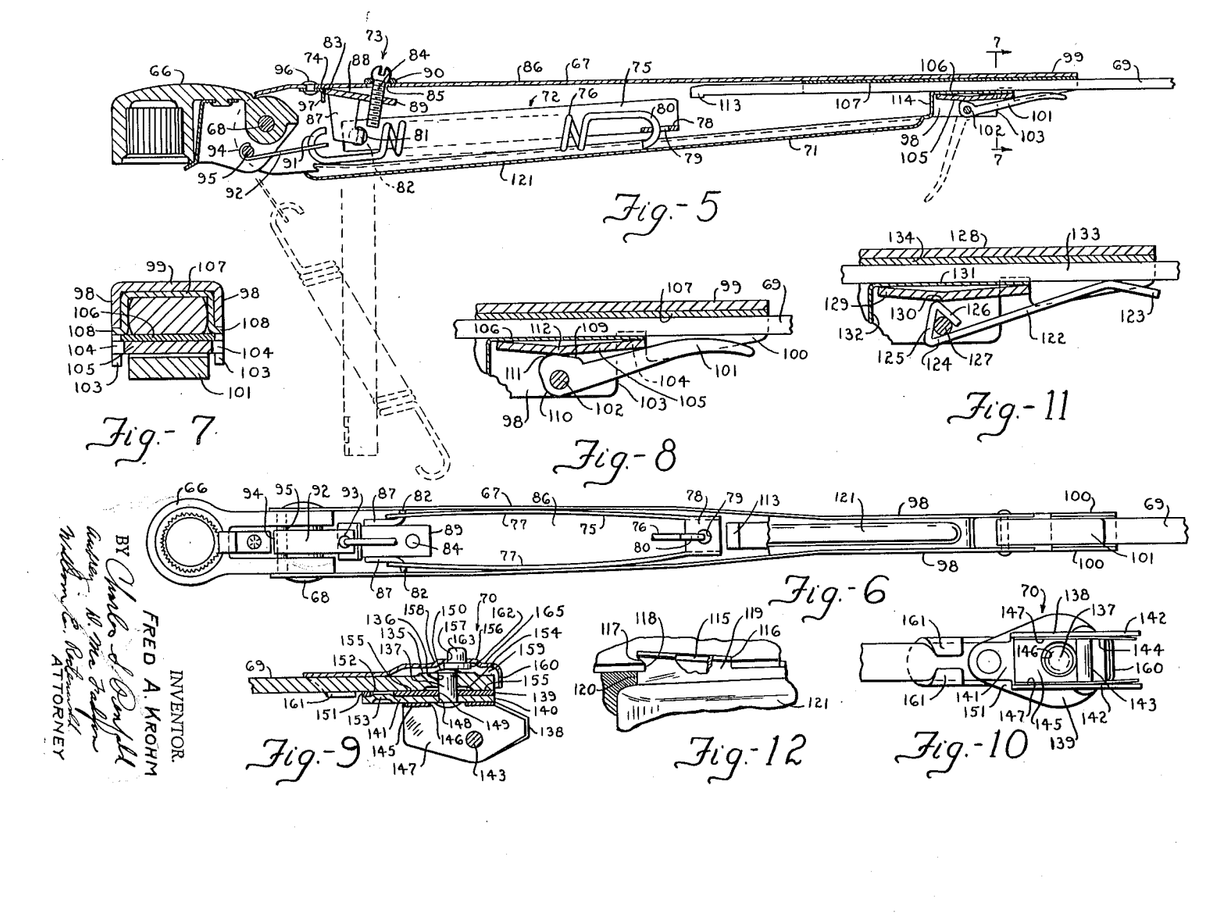
FIGURE 5 is a longitudinal section taken through a modified form of an arm assembly.
FIGURE 6 is a bottom view of the arm assembly shown in FIGURE 5.
FIGURE 7 is a transverse section taken substantially on line 7—7 of FIGURE 5 illustrating certain structural details of an improved means for facilitating longitudinal adjustment and locking of the outer arm section.
FIGURE 8 is an enlarged partial longitudinal sectional view of a part of the arm structure illustrating more in detail the improved means for facilitating longitudinal adjustment of the outer arm section.
FIGURE 9 is an enlarged longitudinal sectional view exemplifying an improved connection means carried by the outer arm section for supporting a wiper blade.
FIGURE 10 is a bottom view of the structure depicted in FIGURE 9.
FIGURE 11 illustrates a modified form of means which may be utilized to facilitate longitudinal adjustment and locking of the outer arm section.
FIGURE 12 is an enlarged partial view of the arm and a cover therefor.

An inner hooked end 91 of the spring is preferably connected to the inner arm section by a link 92. The outer end of this link is provided with a hole 93 which receives the hooked end 91 of the spring and the inner end of the link is preferably formed to provide an arcuate loop or hook 94 which pivotally receives an abutment preferably in the form of a cross pin 95 carried by the inner section. The link, among other things, serves to allow the spring to freely operate without interference. When the components of the arm are assembled, as depicted in FIGURE 5, the spring will pull the lever 75 about its pivotal connection with the supporting member 83 and thereby urge the outer ends of the lever and spring in a direction to cause the channel and outer sections as a unit to swing or pivot relative to the inner section and toward a windshield. It is to be noted that the legs 77 of the lever are of a resiliently flexible character so as to facilitate the insertion of the lateral projections 82 on the supporting member into the apertures 81 provided in the inner ends of the legs. If found desirable, this arrangement may be reversed by providing the legs with projections which register with holes provided in the depending portions of the supporting member. The dotted-line diagram of the spring, lever and link in FIGURE 5 illustrates the preferred procedure employed in operatively connecting these parts with the other components of the arm. As therein shown, the outer end of the spring may engage the cover, but if found desirable a stop may be provided on the channel for engagement by the spring and/or the lever to limit the outward swing of the biasing means, or the lever may be formed to engage the cover and/or channel for limiting the swinging movement of the lever in one direction.

In view of the foregoing, it will be apparent that if a greater or a lesser force is required to urge the arm toward a windshield this may be readily obtained by merely adjusting the supporting member 83 through manipulation of the screw 84. Thus, when the screw is tightened, the supporting member will be pivoted or rocked to shift forwardly the pivotal connection between the lever and member and thereby stretch the spring to increase the pressure applied to the arm, whereas loosening of the screw will decrease the pressure.

The abutment means 74, above referred to, is preferably in the form of an angular part having a base portion secured to the base wall 86 of the channel by a rivet 96 and a depending portion 97 which may be forcibly engaged by the bridge 88 of the supporting member 83 through the force exerted by the biasing means, as shown in FIGURES 5 and 6. The abutment means serves to stabilize the position of the supporting member and receive part of the thrust of the spring through this member and thereby removes some of the strain placed upon the screw so the latter can be easily manipulated. The slot 85 in the channel allows the screw to readily adjust itself by sliding therein and affords a better leverage factor.

The means employed to facilitate longitudinal adjustment of the outer arm will now be described. The outer extremity of the channel arm section 67 is preferably constructed to provide a reduced channel formation of appreciable length so as to slidably receive and stabilize the movement of the outer section therein. This formation includes side wall portions 98 and a base or front wall portion 99, all of which constitute continuations of the larger walls forming the inner extremity or remainder of the channel. The side wall portions 98 are preferably formed adjacent their outer extremities with marginal edges 100 which are inclined with respect to the longitudinal axis of the arm. A lever 101 has its inner end disposed between the side wall portions, and a pivot pin 102 extends through holes provided therefor in the wall portions and inner end of the lever to pivotally connect the lever to the channel section. The inclined marginal edges 100 of the side wall portions are preferably notched at 103, as shown in FIGURES 6, 7 and 8, and these notches receive lateral projections 104 provided on the outer end of an elongate resiliently flexible element or spring 105, which is bowed so that its ends or longitudinally spaced portions thereof will resiliently bear against a tongue 106 formed on a reduced outer extremity of the cover 71, as depicted in FIGURES 5, 7 and 8. The tongue is disposed in the channel formation in bearing relation to the outer arm section and a maximum amount of pressure may be applied to the arm section through the agency of the flexible element 105 by manipulating or pivoting the lever to the full-line locking position as best evidenced in FIGURES 5 and 8. When the lever is manually swung to the dotted line position, as shown in FIGURE 5, the pressure against the arm is appreciably relieved, whereupon the outer arm section may be extended or retracted to the longitudinal position desired and then relocked in place by swinging the lever back to the full-line position. In order to prevent gauling and obtain a smooth sliding action between the outer arm section and channel section, a liner 107 of channel form constructed from some desirable material, such as bronze, is seated in the channel formation with the outer arm section slidably mounted therein. The side walls of the liner are preferably provided with lateral lugs 108 which fit in the notches 103 under the tongue 106 of the cover and the projections 104 provided on the flexible element 105.

It will be noted by referring to FIGURES 5 and 8 that the inner end of the lever is generally cylindrical with the pivot pin 102 extending eccentrically therethrough and provided with a flat portion 109, a convex surface 110 disposed relatively close to the axis of the pivot, and a convex cam surface 111 disposed somewhat farther away from said axis. Thus, when the lever is manipulated to the dotted-line position, its surface 110 will engage a raised intermediate portion 112 formed on the flexible element to relax or reduce the pressure exerted thereby so that the outer arm section can be retracted or extended as desired. When the lever is being swung toward the full-line locking position, its cam surface 111 will gradually increase the pressure applied to the spring element; and when the flat portion 109 of the lever is brought into proper bearing relationship with the element adjacent one side of the midpoint or crest of the raised portion 112, the element will be flexed or distorted so that it will apply a maximum and constant pressure to the cover and outer arm section and thereby firmly lock these components in place to prevent longitudinal movement of the section after adjustment. The relationship of the flat portion 109 of the lever to the crest of the spring element is preferably such that the element serves to hold the lever in a locked position.

It will also be noted that the liner 107 nests substantially within the confines of the channel formation, and affords relatively large longitudinal bearing areas for the outer arm section, that the element and tongue are substantially concealed from view, and that the lever is curved and nests substantially within the confines of the channel formation to streamline and improve the appearance of the arm. The free end of the lever is preferably curved or formed in such a way that when the lever is in a locked position a tool or digit of the hand can be forced under the end to release the lever from said position. The outer arm section may be adjusted to the position shown or retracted farther inwardly between the legs of the lever 75 to a point where an offset 113 on the section may engage the supporting member 83 or screw 84. The arm section may also be extended outwardly to any desired position until the offset 113 engages a shoulder 114 formed on the cover 71.

The cover 71 is resiliently flexible and its relation to the arm will now be described. The marginal edges of the sides walls of the inner extremity of the channel arm section 67 are notched, as best depicted in FIGURE 12. Each notch is preferably defined by a straight base edge 115 disposed at an angle with reference to the longitudinal axis of the arm, and end edge 116 disposed substantially at right angles to the base edge, and an edge 117 inclined with respect to the base edge to form a dovetail recess having a portion 118 overlying the base edge, as in FIGURES 5 and 12. The inner extremity of the cover, which is wider than its outer reduced extremity, is slightly offset or angled with reference to the longitudinal axis of the cover, and provided with lateral projections 119 which are adapted to nest substantially within the confines of the recesses. The projections are provided with inner or end transverse marginal edges 120 which respectively fit under the overlying portions 118. It may be stated that the side walls of the channel are designed and constructed to provide receiving means or hooks for the projections on the cover. The cover is preferably attached to the arm by holding the cover at an angle and placing the projections in the recesses under the overlying portions 118 and then swinging or bringing the cover into a general nesting relationship with the channel section so that its tongue 106 is seated against the undersurface of the outer arm section, after which the flexible element 105 is placed against the tongue with its projections seated in the notches 103 in the channel formation, whereupon the lever 75 is secured in place by the pivot 102 to lock the tongue in place and simultaneously hold or lock the projections 119 in the notches under the portions 118. It is, of course, to be understood that the liner and outer arm section have been previously placed in the channel section. The cover follows the interior contour of the channel section for substantial nesting therein, and is preferably provided with a tapered longitudinally extending exterior corrugation or rib 121 which is more or less located externally of the channel section and generally follows the design of the section.

Attention is directed to the fact that due to the flexible character of the cover and the angular relationship of its rear extremity and angular disposition of the recesses in the channel section which receive the projections 119, the cover will be slightly flexed or placed under stress when properly assembled with the channel section. In other words, the cover is resiliently held in place to prevent vibration or noise between the cover and arm, irrespective of whether the outer reduced extremity of the cover is firmly or loosely secured in place.

As exemplified in FIGURE 11 of the drawing, a different form of lever may be utilized in lieu of the lever 101 above referred to. The lever shown in FIGURE 11 includes an inner generally triangular extremity, an intermediate straight shank 122, and an outer offset or angled handle portion 123. The triangular extremity preferably includes a wall 124 constituting a continuation of the shank, a wall 125 angularly disposed with respect to the wall 124 and constituting a continuation thereof, and a wall 126 angularly disposed with respect to the wall 125 and constituting a continuation thereof. Otherwise expressed, the shank is provided with a V-shaped continuation which, in combination with the shank, forms what may be termed an equilateral formation. A pivot pin 127 extends through the inner extremity of the lever for pivotally connecting the lever to a channel arm section 128 corresponding to the channel section 67 above described. When the lever is in the locked position shown in FIGURE 11, the junction between the walls 125 and 126 will bear or engage a bowed resiliently flexible element or spring 129 at a location slightly to the rear of its high point or crest 130 to flex and place the element under stress and force it against a tongue or offset 131 provided on a cover 132, the offset against an extensible retractible arm section 133, this arm section against a liner 134, and the latter against the base wall of the channel section 128. In other words, the components just described are assembled and held in substantially the same manner that the corresponding components shown in FIGURE 8 are assembled and held. It will also be apparent that when the lever is in the locked position the junction or material joining the shank and handle portions of the lever will bear against the outer arm. When the lever is pried away from the arm section and swung to a depending position, the wall 125 of its triangular formation will engage the crest or an adjacent portion of the element 129 and thereby relieve or reduce the stress applied to the element so that the outer arm section may be adjusted to a longitudinal position desired, after which it may be readily locked in place by merely swinging the lever back to its locked position as evidenced in FIGURE 11.

The connection means generally designated 70 and clearly illustrated in FIGURES 9 and 10 will now be described. The outer arm section 69 is provided with a transversely disposed raised resiliently flexible channel formation 135 which is inset a predetermined distance inwardly from the end of the section and provided with a centrally disposed aperture 136 through which a fastening means, preferably in the form of a rivet 137, extends for pivotally connecting a channel connector member 138 and a friction member 139 to the arm section. More specifically in this respect, the channel connector includes a base wall 140 provided with a rearwardly extending continuation 141 and corresponding side walls 142 through which a cylindrical cross pin 143 extends for pivotal connection with a fitting carried by a wiper blade.

A channel-shaped resiliently flexible liner 144 is secured in the channel connector by the cross pin and includes a base wall 145 having a clearance opening 146 therein for an upset end of the rivet and side walls 147 having holes therein through which the pin extends. The forward extremities of the side walls are preferably inturned at an angle, as shown in FIGURE 10, for straddling engagement with the fitting on the blade in order to prevent vibration or rattle therebetween. The liner also serves to promote a smooth acting pivotal connection between the connector and fitting and is preferably constructed from desirable material, such as bronze, so as to prevent gauling therebetween. The base wall of the connector channel and the friction member are respectively provided with apertures 148 and 149 through which the rivet extends. The rivet has a head 150 which bears against the upper surface of the channel formation 135 formed on the arm section.

The friction member 139 is preferably of a resiliently flexible character and includes a rearwardly extending continuation or radial portion 151 which is provided with an opening 152, which receives an offset projection or detent 153 provided on the continuation 141 of the channel connector for connecting or joining the member and connector for pivotal or rotational movement as a unit with respect to the arm. Obviously, the connector and member could be secured together for unison movement in various other ways. For example, the detent could be placed on the member and the opening in the connector in lieu of the arrangement shown, or they could be welded together.

The organization is preferably such that when the connector and friction member are firmly secured to the arm by the rivet, an annular portion or central portion of the member close to the rivet will be flexed or distorted upwardly into a recess 154 defined by the channel formation 135 on the arm and thereby cause outer portions of the member beyond this central area to exert appreciable pressure against inner spaced surfaces 155 of the arm section on opposite sides of the recess or channel formation and against the upper surface of the base wall of the connector on opposite sides of the rivet. Attention is directed to the fact that the raised portion 135 of the arm section 69 is also distorted or flexed toward the friction element due to the relief offered by the recess 154 so that either this element and/or the raised portion will serve to retard relative movement between the connector and arm to the extent desired. With this unique setup the connector and friction member as a unit, including a blade attached thereto, can be readily manually pivoted or rotated relative to the arm to any correct angular position desired for properly wiping the greatest area of a windshield permitted by the installation. Due to the frictional resistance afforded by the organization, the blade will be automatically held at any angle to which it has been adjusted.

In order to promote the general appearance of the connector means, a shroud or cover is preferably connected to the outer arm section for covering a portion of the section and particularly the head 150 of the rivet. This shroud is preferably made in the form of an elongate channel having an enlarged outer extremity and a smaller inner extremity. The enlarged extremity includes a base wall 165 formed to provide an elevated annular portion or platform 156 having an opening 157 therein and portions 158 which slope upwardly and join the annular portion. The shroud also includes side walls 159 which straddle the marginal edges of the outer arm section and an end wall 160 which extends downwardly across the end edge of the arm section. The smaller extremity of the shroud includes a base wall portion and side wall portions which constitute continuations of the base wall and side walls of the larger extremity. The shroud may be secured in place in various ways; but, as shown, this is preferably accomplished by providing the side wall portions of the smaller extremity with fingers or lugs 161 which are inturned against the underside of the arm section to firmly and permanently secure the shroud thereto.

The means employed to identify the origin of the product and impart a significant structural characteristic thereto preferably comprises a button having an annular base 162, which is held between certain arm components, such as the shroud and rivet, so that an axial cylindrical portion 163 of the button will extend through the opening 157 in the shroud. The outer end of the axial portion is preferably rounded or made convex to improve its appearance. The button is preferably made of suitable plastic, which may be colored as desired so as to attract one's eye thereto. In other words, the design, construction, and color of the button are such that it is attractive and harmonizes with the general design of the arm proper.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A windshield wiper arm comprising a first and second section pivotally mounted relative to each other, means for connecting said first section to an actuating shaft, helical spring means having one end portion connected to said first section, adjustable means carried by said second section and connected to the other end portion of said spring means whereby said first and second sections are biased relative to each other, and means extending through said second section and engaging with said adjustable means for varying the degree of bias on said spring means.

2. A windshield wiper arm having first and second sections pivotally mounted relative to each other, support means adjustably positioned within said second section and having one offset edge supported thereon, adjusting means acting on said support means for pivoting said support means about said offset edge, a bracket member mounted on said support means and lying substantially parallel to and within said second section, and spring means interconnected with said bracket member and said first section for biasing said second section relative to said first section whereby movement of the adjusting means will pivot the support means and its associated bracket member in a direction to vary the degree of bias in said spring means.

3. A windshield wiper arm comprising a plurality of longitudinally extending sections, means for connecting a first one of said sections to an actuating shaft, a second one of said sections pivotally mounted on said first section, support means carried by said second section, adjusting means extending through an opening in said second section and threadably engaging with said support means to shift at least a portion of said support means longitudinally in said section, U-shaped mounting means engaging at the open end of the U with said support means, and spring means spaced from said support means and fastened between the closed end of said U-shaped mounting means and said first section whereby movement of the adjusting means will vary the tension of said spring means.

4. A windshield wiper arm comprising a plurality of longitudinally extending sections, means for connecting a first one of said sections to an actuating shaft, a second one of said sections pivotally mounted on said first section, spring means operatively connected with said first and second sections to bias said second section about the pivotal mounting on said first section, and means spaced from said spring means for changing the degree of bias exerted by said spring means comprising support means supported against said second section, adjusting means extending through an opening in said second section and threadably engaging with said support means, and elongate frame means having one end acting on said support means and its other end on said spring means whereby the tension on the spring can be varied by adjusting the support means longitudinally relative to the second section.

5. In a windshield wiper arm having a first section, a second section pivotally mounted relative to said first section, means for connecting said first section to an actuating shaft of a driving motor, and a helical spring associated with said second section and engaging with said first section to bias said second section about said first section, the combination of means for changing the degree of bias exerted by said spring comprising an elongate U-shaped bracket member lying substantially parallel to and within the second section and having one end of said spring fastened to the bottom portion of the U-shaped bracket, support means carried within said second section and having one edge supported thereon, interengaging means on said bracket and said support means for supporting one relative to the other, and adjusting means acting on said support means for pivoting said support means about said engaged edge for moving said bracket and one end of said spring relative to said first section whereby the degree of bias of the spring is varied.

6. A windshild wiper arm having a first section drivingly connected to a driving motor, a second longitudinally extending housing section pivotally mounted relative to said first section, said second section having a generally U-shaped cross section with the bottom of the U forming a roof and the legs of the U the side walls of the housing, a support member having an offset edge supported with respect to the undersurface of the roof of the housing, said support member having a pair of integral leg elements having apertures therein, an elongate U-shaped bracket lying substantially parallel to said roof and within the side walls of said second section, a pair of ears formed on the open end portion of said bracket adapted to pivotally engage in the apertures formed in the legs of said support member, an adjusting screw passing through the roof of said second section and engaging with said support member for pivoting said support member about said offset edge, a spring enclosed within the housing section and said bracket, said spring engaging at one end portion with the first section and at the other end portion with the closed end of the U-shaped bracket for biasing the first and second sections relative to each other, and a retainer carried by the bottom edges of the walls of the second section for holding said spring and bracket operatively assembled within said second section whereby turning the screw will pivot the support member about said offset edge and move the bracket longitudinally within the housing carrying the one end of the spring therewith for varying the tension of the spring.

7. A windshield wiper arm comprising an attaching section and a housing pivotally mounted relative to each other, an adjusting screw passing through a roof of said housing, an inverted U-shaped support member positioned within said housing by said screw and having an offset edge bearing against the roof of the housing so that the legs of said support will be adapted to swing in an arc longitudinally of the housing upon turning said screw, a bracket member having a pair of legs connected by a closed portion, said bracket lying substantially parallel to the roof of the housing and within side walls thereof, the free end portions of the legs of said bracket member pivotally engaging with downwardly disposed end portions of the legs of the support member, the closed portion of said bracket being disposed radially outwardly from the attaching section, a spring enclosed within the attaching section and the housing, said spring engaging at one end portion with the attaching section and at the other end portion with the closed portion of the bracket member and being substantially encased in part by said bracket for biasing said attaching section and housing together, and a cover member fastened to the open side of the housing for holding the spring and bracket member operatively assembled within the housing whereby turning the screw will pivot the support member about the offset edge and move the bracket and one end of the spring relative to the other end of the spring for varying the tension of said spring.

8. A windshield wiper arm assembly comprising a shaft-attaching section, an arm section pivotally connected to the attaching section, means on the arm section for supporting a wiper blade, adjustable means carried by the arm section, an elongate member having its inner end pivotally connected to the adjustable means, and elongate resilient means having one end connected to the attaching section and its other end to the outer end of the member, the points of connection between the resilient means, attaching section and member being located at one side of the point of connection between the attaching section and arm section so that the resilient means will cause the arm section to be urged toward a windshield when the attaching section is coupled to a drive shaft.

9. A windshield wiper arm comprising a first section for attachment to a driven member and an elongate second section pivoted to the first section and extending therefrom, an elongate lever having its inner end pivotally adjustable on the inner extremity of the second section and its outer end extending toward the outer extremity of the second section, and a spring connected to the first section and to the outer end of the lever for urging the second section toward a windshield.

10. A windshield wiper arm comprising an inner section for attachment to a driven element and an elongate outer section pivoted to the inner section and having means at its outer end for connection with a wiper blade, a member adjustably supported on the outer section, a lever having an inner end pivotally connected to the outer section and an outer free end extending forwardly toward the connection means, an elongate spring having one end connected to the inner section and its other end to the outer free end of the lever for urging the outer section toward a windshield, and means for operating the member to vary the tension of the spring.

11. A windshield wiper arm comprising a first and second section pivotally mounted relative to each other, means for connecting said first section to a driven member, helical spring means having one end portion connected to said first section, adjustable means carried by said second section and connected to the other end portion of said spring means whereby said first and second sections are biased relative to each other, means providing a stop for the adjustable means, and means extending through said second section and engaging with said adjustable means for varying the degree of bias on said spring means.

12. A windshield wiper arm having first and second sections pivotally mounted relative to each other, support means adjustably positioned within said second section and having one offset edge supported thereon, adjusting means acting on said support means for pivoting said support means about said offset edge, a bracket member mounted on said support means and lying substantially parallel to and within said second section, a link extending from the first section, and spring means connected with said link and bracket member for biasing said second section relative to said first section whereby movement of the adjusting means will pivot the support means and its associated bracket member in a direction to vary the degree of bias in said spring means.

13. A windshield wiper arm comprising a plurality of longitudinally extending sections, means for connecting a first one of said sections to a driven member, a second one of said sections pivotally mounted on said first section, support means carried by said second section, a stop on said second section for said support means, adjusting means extending through an opening in said second section and threadably engaging with said support means to shift at least a portion of said support means longitudinally in said section, U-shaped mounting means engaging at the open end of the U with said support means, and spring means spaced from said support means and fastened between the closed end of said U-shaped mounting means and said first section whereby movement of the adjusting means will vary the tension of said spring means.

14. A windshield wiper arm comprising a plurality of longitudinally extending sections, means for connecting a first one of said sections to an actuating shaft, a second one of said sections pivotally mounted on said first section, spring means operatively connected with said first and second sections to bias said second section about the pivotal mounting on said first section, and means spaced from said spring means for changing the degree of bias exerted by said spring means comprising support means supported against said second section, adjusting means extending through an opening in said second section and threadably engaging with said support means, elongate frame means having one end acting on said support means and its other end on said spring means whereby the tension on the spring can be varied by adjusting the support means longitudinally relative to the second section, and means cooperable with said support means for stabilizing its position.

15. In a windshield wiper arm having a first section, a second section pivotally mounted relative to said first section, means for connecting said first section to an actuator, and a helical spring associated with said second section and engaging with said first section to bias said second section about said first section, the combination of means for changing the degree of bias exerted by said spring comprising an elongate lever member lying substantially parallel to and within the second section and having one end of said spring fastened to its outer extremity, support means carried within said second section and supported thereon, interengaging means on said lever and said support means for supporting one relative to the other, adjusting means acting on said support means for moving said support means relative to said lever for moving the lever and one end of said spring relative to said first section whereby the degree of bias of the spring is varied, and means for stabilizing the support means.

16. A windshield wiper arm having a first section adapted for connection with an actuator, a second longitudinally extending housing section pivotally mounted relative to said first section, said second section having a bottom wall and side walls, a support member supported with respect to the undersurface of the bottom wall of the housing, an elongate U-shaped bracket member lying substantially parallel to said bottom wall and within the side walls of said second section, one of said members being provided with apertures and the other member with a pair of ears pivotally disposed in the apertures, an adjusting screw passing through the bottom wall of said second section and engaging with said support member for pivoting said support member relative to the second section, a spring enclosed within the housing section and said bracket member, a link connecting one end of the spring with the first section and means connecting its other end with the closed end of the bracket member for biasing the first and second sections relative to each other, and a retainer carried by the walls of the second section for holding said spring and bracket member operatively assembled within said second section whereby turning the screw will pivot the support member and move the bracket member longitudinally within the housing carrying the one end of the spring therewith for varying the tension of the spring.

17. A windshield wiper arm comprising an attaching section and a housing pivotally mounted relative to each other, an adjusting screw passing through a roof of said housing, an inverted U-shaped support member positioned within said housing by said screw, an offset edge on said support supported against the roof of the housing so that legs of said support will be adapted to swing in an arc longitudinally of the housing upon turning said screw, abutment means carried by the housing for said support member, a bracket member having a pair of legs connected by a closed portion, said bracket lying substantially parallel to the roof of the housing and within the side walls thereof, the free end portions of the legs of said bracket member pivotally engaging with downwardly disposed end portions of the legs of the support member, the closed portion of said bracket being disposed radially outwardly from the attaching section, a spring enclosed within the attaching section and the housing, said spring having one end portion operatively connected with the attaching section and its other end portion with the closed portion of the bracket member and being substantially encased in part by said bracket for biasing said attaching section and housing together, and a cover member fastened to the open side of the housing for holding the spring and bracket member operatively assembled within the housing whereby turning the screw will pivot the support member about the offset edge and move the bracket and one end of the spring relative to the other end of the spring for varying the tension of said spring.

18. A windshield wiper arm assembly comprising an attaching section, an arm section pivotally connected to the attaching section, means on the arm section for supporting a wiper blade, adjustable means carried by the arm section, abutment means for said adjustable means, an elongate member having its inner end pivotally connected to the adjustable means, and elongate resilient means having one end operatively connected to the attaching section and its other end to an outer portion of the member, the points of connection between the resilient means, attaching section and member being located at one side of the point of connection between the attaching section and arm section so that the resilient means will cause the arm section to be urged toward a windshield when the attaching section is coupled to a drive shaft.

19. A windshield wiper arm comprising a first section for attachment to a driven member and an elongate second section pivoted to the first section extending therefrom, an elongate lever having its inner end pivotally adjustable on the inner extremity of the second section and its outer end extending toward the outer extremity of the second section, a link, and a spring operatively connected to the first section by the link and to the outer end of the lever for urging the second section toward a windshield.

20. A windshield wiper arm comprising an inner section for attachment to a driven element and an elongate outer unit pivoted to the inner section and having means at its outer end for connection with a wiper blade, a member adjustably supported on the outer unit, a lever having an inner end pivotally connected to the outer unit and an outer free end extending forwardly toward the connection means, a link, an elongate spring having one end connected to the inner section by the link and its other end to the outer free end of the lever for urging the outer unit toward a windshield, and means slidably mounted on the outer unit for operating the member to vary the tension of the spring.

21. In combination: a wiper arm assembly comprising a channel section and an extensible section slidably mounted in the channel section, an elongate cover having a portion disposed in the channel section and engaging the extensible section, a spring bearing against the cover portion, and a lever pivotally connected to the channel section for movement in the plane of this section for flexing the spring to cause it to force the cover portion against the extensible section for locking this section in place after adjustment.

22. The combination defined in claim 21 in which the lever is constructed from a strip of sheet material having a head for engaging the spring.

23. A windshield wiper arm comprising a first and second section pivotally mounted relative to each other, a third section slidably adjustable on said second section and provided with means for supporting a blade, means for connecting said first section to an actuating shaft, helical spring means having one end portion connected to said first section, adjustable means carried by said second section and connected to the other end portion of said spring means whereby said second and third sections as a unit are biased relative to said first section, means extending through said second section and engaging with said adjustable means for varying the degree of bias on said spring means, an elongate cover having an inner end secured to an inner portion of said second section and an outer end disposed relative to said third section, and means for forcing the outer end of said cover in a direction to lock said third section in any desired position to which it has been adjusted.

24. A windshield wiper arm comprising an inner section for attachment to a driven element, an intermediate section pivoted to the inner section, an outer section slidably adjustable on the intermediate section and provided with means at its outer end for connection with a wiper blade, a member adjustably supported on the intermediate section, a lever having an inner end pivotally connected to the intermediate section and an outer free end extending forwardly toward the connection means, an elongate spring having one end connected to the inner section and its other end to the outer free end of the lever for urging the intermediate and outer sections as a unit toward a windshield, means for operating the member to vary the tension of the spring, manually operable pressure-applying means carried by the intermediate section, and an elongate cover underlying the lever and spring and having an outer extremity disposed between the outer section and pressure-applying means in a manner whereby the latter can be manipulated to force said outer extremity in a direction to lock the outer section in any selected position of adjustment relative to said intermediate section.

25. A windshield wiper arm comprising a first section for attachment to a driven member and an elongate second section having an inner end pivoted to the first section and an outer extremity extending therefrom, a third section slidably adjustable on the second section for supporting a blade, an elongate lever having its inner end pivotally adjustable on the inner extremity of the second section and its outer end extending toward the outer extremity of the second section, a link, a spring operatively connected to the first section by the link and to the outer end of the lever for urging the second and third sections as a unit toward a windshield, manually operable pressure-applying means carried by the outer extremity of said second section, and an elongate cover having an inner end connected to an inner portion of said second section and an outer end disposed between said third section and said pressure-applying means in a manner whereby the latter can be manipulated to force said outer end of said cover in a direction to lock the third section in any selected position of adjustment relative to said second section.

26. In combination: a wiper arm assembly comprising a first section and a second section, said second section being slidably received in bearing means in the first section and axially extensible therefrom, a portion of the first section overlying a portion of the bearing means and disposed in juxtaposition with the extensible section, a resilient member bearing against the overlying portion in contact therewith, and a pressure-applying means anchored on the first section and adapted upon manual manipulation to urge the resilient member against the overlying portion thereby urging the overlying portion toward the bearing means to establish frictional holding engagement with the extensible section whereby the first and second sections are restrained in place against relative axial movement.

27. The structure of claim 26 wherein the first section has a channel portion receiving the second section and the overlying portion is disposed in the channel portion.

28. An extensible windshield wiper arm comprising: a first section, an extensible section slidably mounted in a channel portion of the first section, a cover disposed in the channel portion and having a portion disposed juxtaposed a portion of the extensible section, a plate bearing against the portion of the cover, and a lever pivotally mounted on the channel portion and adapted upon manual manipulation to bring a portion thereof to bear against the plate to urge the portion of the cover against the extensible section in holding frictional engagement therewith for locking the extensible section in place on the first section after adjustment, cooperating means on the plate and portion of the cover preventing relative displacement therebetween.

References Cited in the file of this patent

UNITED STATES PATENTS

| | | |
|---|---|---|
| 2,326,402 | Smulski | Aug. 10, 1943 |
| 2,350,134 | Smulski | May 30, 1944 |
| 2,632,908 | Krohm | Mar. 31, 1953 |
| 2,715,729 | Anderson | Aug. 16, 1955 |
| 2,807,822 | Scinta | Oct. 1, 1957 |
| 2,850,755 | Deibel | Sept. 9, 1958 |
| 2,860,364 | Krohm | Nov. 18, 1958 |

FOREIGN PATENTS

| | | |
|---|---|---|
| 665,362 | Great Britain | Jan. 23, 1952 |
| 756,229 | Great Britain | Sept. 5, 1956 |

UNITED STATES PATENT OFFICE
CERTIFICATE OF CORRECTION

Patent No. 3,064,297                        November 20, 1962

Fred A. Krohm

It is hereby certified that error appears in the above numbered patent requiring correction and that the said Letters Patent should read as corrected below.

Column 13, line 1, for "within side" read -- within the side --; column 15, line 53, for "section extending" read -- section and extending --.

Signed and sealed this 7th day of January 1964.

(SEAL)
Attest:
ERNEST W. SWIDER                        EDWIN L. REYNOLDS Attesting Officer                          Acting Commissioner of Patents